US012570170B2

(12) United States Patent
Zhou et al.

(10) Patent No.: US 12,570,170 B2
(45) Date of Patent: Mar. 10, 2026

(54) DIRECT CURRENT CONVERTER, CONTROLLING METHOD, AND VEHICLE

(71) Applicant: GREAT WALL MOTOR COMPANY LIMITED, Baoding (CN)

(72) Inventors: Mingwang Zhou, Baoding (CN); Xuejing Yang, Baoding (CN); Shujiang Chen, Baoding (CN); Gengnan Zhang, Baoding (CN); Yipo Hu, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 526 days.

(21) Appl. No.: 18/009,363

(22) PCT Filed: Sep. 29, 2021

(86) PCT No.: PCT/CN2021/121650
§ 371 (c)(1),
(2) Date: Dec. 9, 2022

(87) PCT Pub. No.: WO2022/073450
PCT Pub. Date: Apr. 14, 2022

(65) Prior Publication Data
US 2023/0219436 A1 Jul. 13, 2023

(30) Foreign Application Priority Data

Oct. 10, 2020 (CN) .......................... 202011080080.8

(51) Int. Cl.
*H02J 7/14* (2006.01)
*B60L 53/20* (2019.01)
(Continued)

(52) U.S. Cl.
CPC .............. *B60L 53/20* (2019.02); *H02J 7/007* (2013.01); *H02M 1/34* (2013.01); *H02M 1/36* (2013.01);
(Continued)

(58) Field of Classification Search
CPC .......... B60L 53/20; B60L 53/22; B60L 53/24; B60L 2210/00; B60L 2210/10;
(Continued)

(56) References Cited

U.S. PATENT DOCUMENTS 9,963,166 B2 * 5/2018 Xu ............................ H02P 4/00
2017/0207634 A1 7/2017 Katano et al.
(Continued)

FOREIGN PATENT DOCUMENTS

CN 104901355 A 9/2015
CN 105871026 A 8/2016
(Continued)

OTHER PUBLICATIONS

International Search Report for PCT/CN2021/121650 issued Dec. 15, 2021.

*Primary Examiner* — Alexis B Pacheco
(74) *Attorney, Agent, or Firm* — Schmeiser, Olsen & Watts LLP

(57) ABSTRACT

A DC converter, a controlling method, and a vehicle are provided. The DC converter includes: a first inductor, a switching unit, a diode, a first capacitor, a load resistor, a pre-charge control unit and a controller. The output terminal of the controller is connected with the control terminal of the switching unit and the control terminal of the pre-charge control unit. The controller is configured to control the switching unit to be turned on or turned off, and to control the resistor connected between the negative electrode of the diode and the first end of the load resistance in the pre-charge control unit when the switching unit is turned off, such that the direct current converter is pre-charged by the low-voltage power supply.

15 Claims, 7 Drawing Sheets

DC converter 100

(51) Int. Cl.
  *H02J 7/00*      (2006.01)
  *H02M 1/34*     (2007.01)
  *H02M 1/36*     (2007.01)
  *H02M 3/156*    (2006.01)
(52) U.S. Cl.
  CPC ......... *H02M 3/156* (2013.01); *B60L 2210/10*
                                                    (2013.01)
(58) Field of Classification Search
  CPC ............. B60L 2210/12; B60L 2210/14; B60L
                2210/20; H02J 7/02; H02J 7/007; H02J
                                                    2007/20
  USPC ....................................................... 320/132
  See application file for complete search history.

(56)               References Cited

U.S. PATENT DOCUMENTS

2018/0298862 A1     10/2018 Choi et al.
2019/0148973 A1*     5/2019 Kim .......................... H02J 7/06
                                                    320/109

| | | | | |
|---|---|---|---|---|
| 2019/0322177 | A1* | 10/2019 | Shirahashi | ................ B60L 1/00 |
| 2020/0195033 | A1* | 6/2020 | Tajima | .................... H02J 7/342 |
| 2021/0008995 | A1* | 1/2021 | Lee | ................... H02M 3/33584 |
| 2021/0291688 | A1* | 9/2021 | Hirose | .................... B60L 50/50 |

FOREIGN PATENT DOCUMENTS

| | | | |
|---|---|---|---|
| CN | 107482741 | A | 12/2017 |
| CN | 107554335 | A | 1/2018 |
| CN | 207339369 | A | 5/2018 |
| CN | 108258894 | A | 7/2018 |
| CN | 109617028 | A | 4/2019 |
| CN | 109617385 | A | 4/2019 |
| CN | 111193296 | A | 5/2020 |
| CN | 111347911 | A | 6/2020 |
| JP | 2017184333 | A | 10/2017 |
| JP | 2018033260 | A | 3/2018 |
| KR | 20190043733 | A | 4/2019 |

* cited by examiner

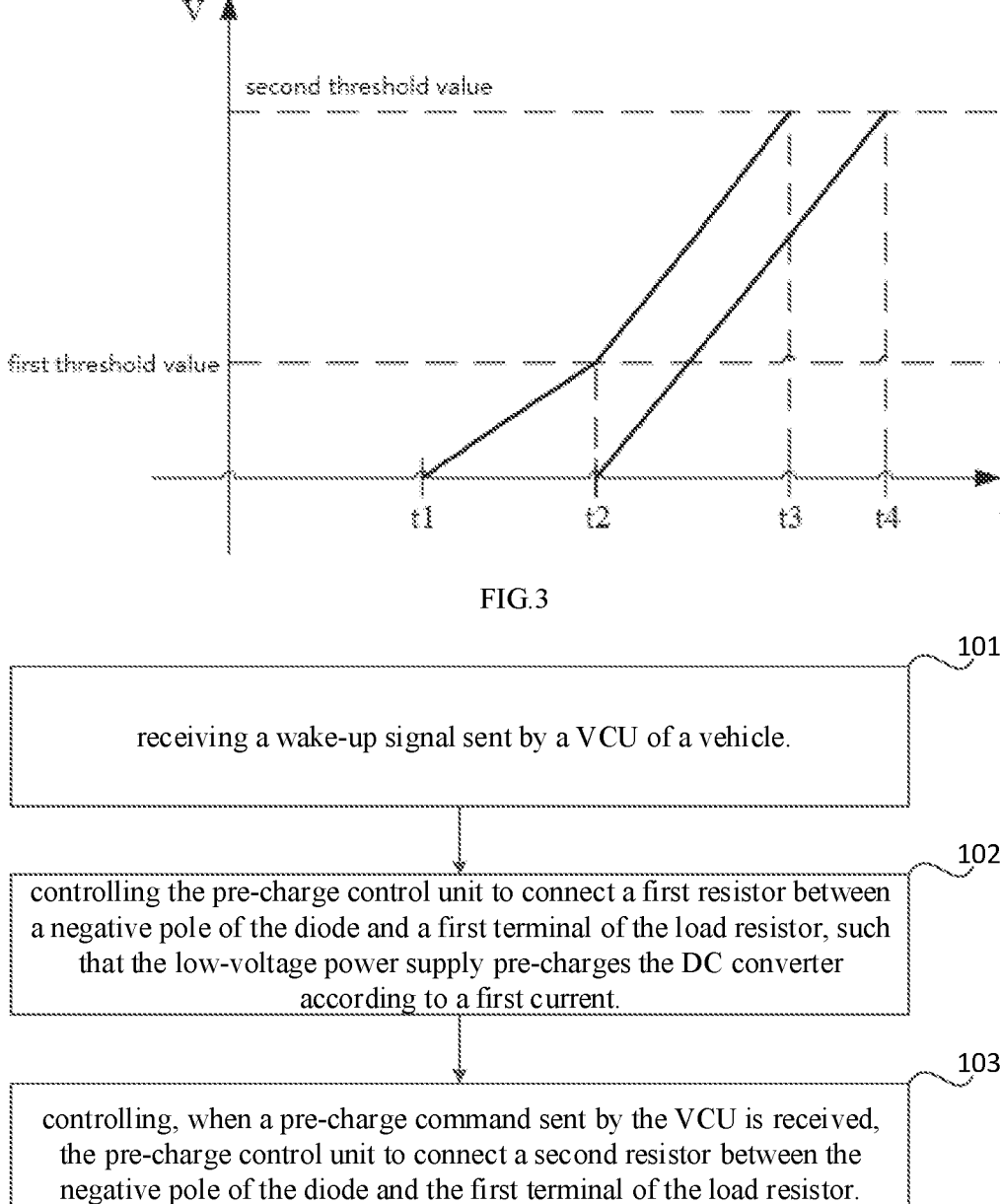

FIG.3

101 receiving a wake-up signal sent by a VCU of a vehicle.

102 controlling the pre-charge control unit to connect a first resistor between a negative pole of the diode and a first terminal of the load resistor, such that the low-voltage power supply pre-charges the DC converter according to a first current.

103 controlling, when a pre-charge command sent by the VCU is received, the pre-charge control unit to connect a second resistor between the negative pole of the diode and the first terminal of the load resistor.

FIG.4

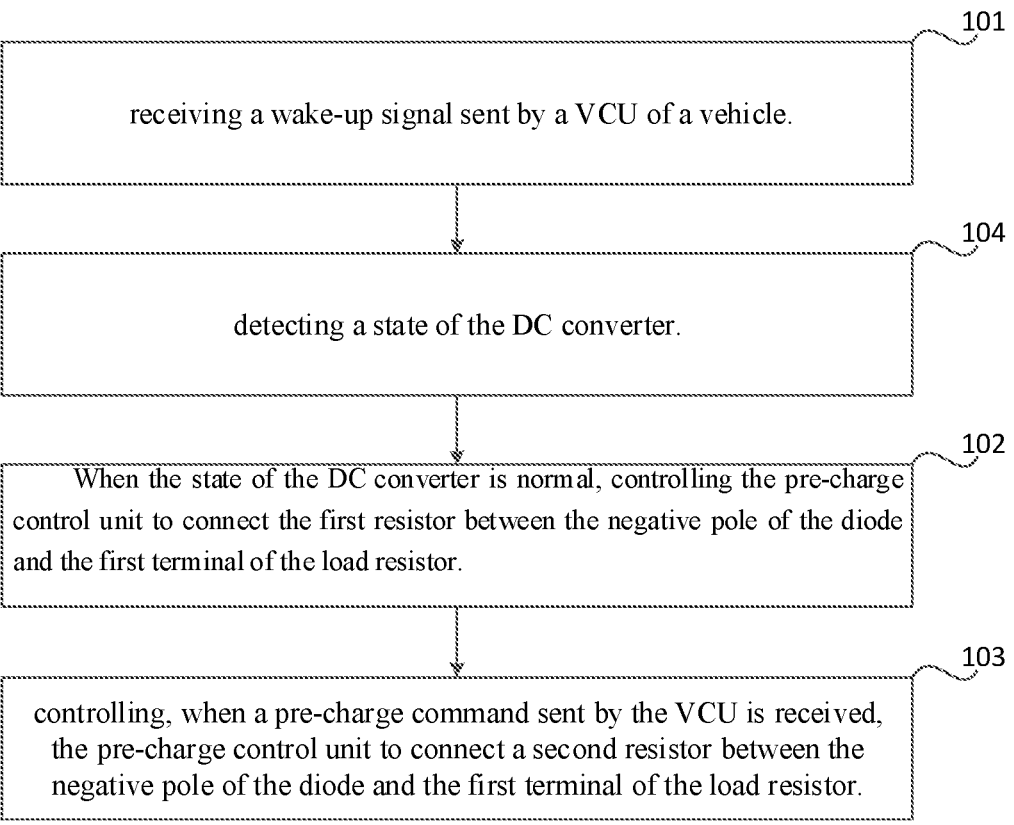

101 receiving a wake-up signal sent by a VCU of a vehicle.

104 detecting a state of the DC converter.

102

When the state of the DC converter is normal, controlling the pre-charge control unit to connect the first resistor between the negative pole of the diode and the first terminal of the load resistor.

103 controlling, when a pre-charge command sent by the VCU is received, the pre-charge control unit to connect a second resistor between the negative pole of the diode and the first terminal of the load resistor.

FIG. 5

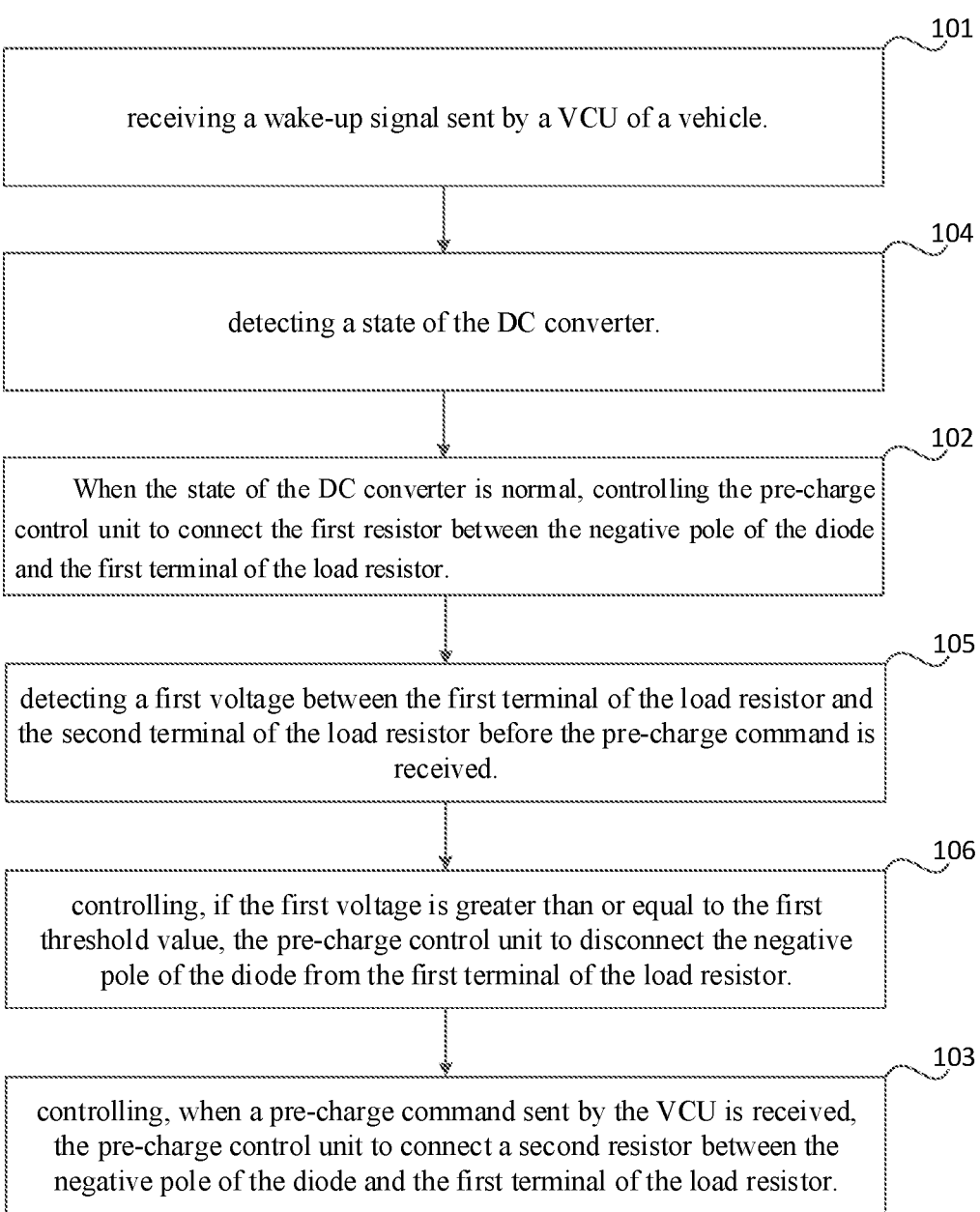

101 receiving a wake-up signal sent by a VCU of a vehicle.

104 detecting a state of the DC converter.

102

When the state of the DC converter is normal, controlling the pre-charge control unit to connect the first resistor between the negative pole of the diode and the first terminal of the load resistor.

105 detecting a first voltage between the first terminal of the load resistor and the second terminal of the load resistor before the pre-charge command is received.

106 controlling, if the first voltage is greater than or equal to the first threshold value, the pre-charge control unit to disconnect the negative pole of the diode from the first terminal of the load resistor.

103 controlling, when a pre-charge command sent by the VCU is received, the pre-charge control unit to connect a second resistor between the negative pole of the diode and the first terminal of the load resistor.

FIG. 6

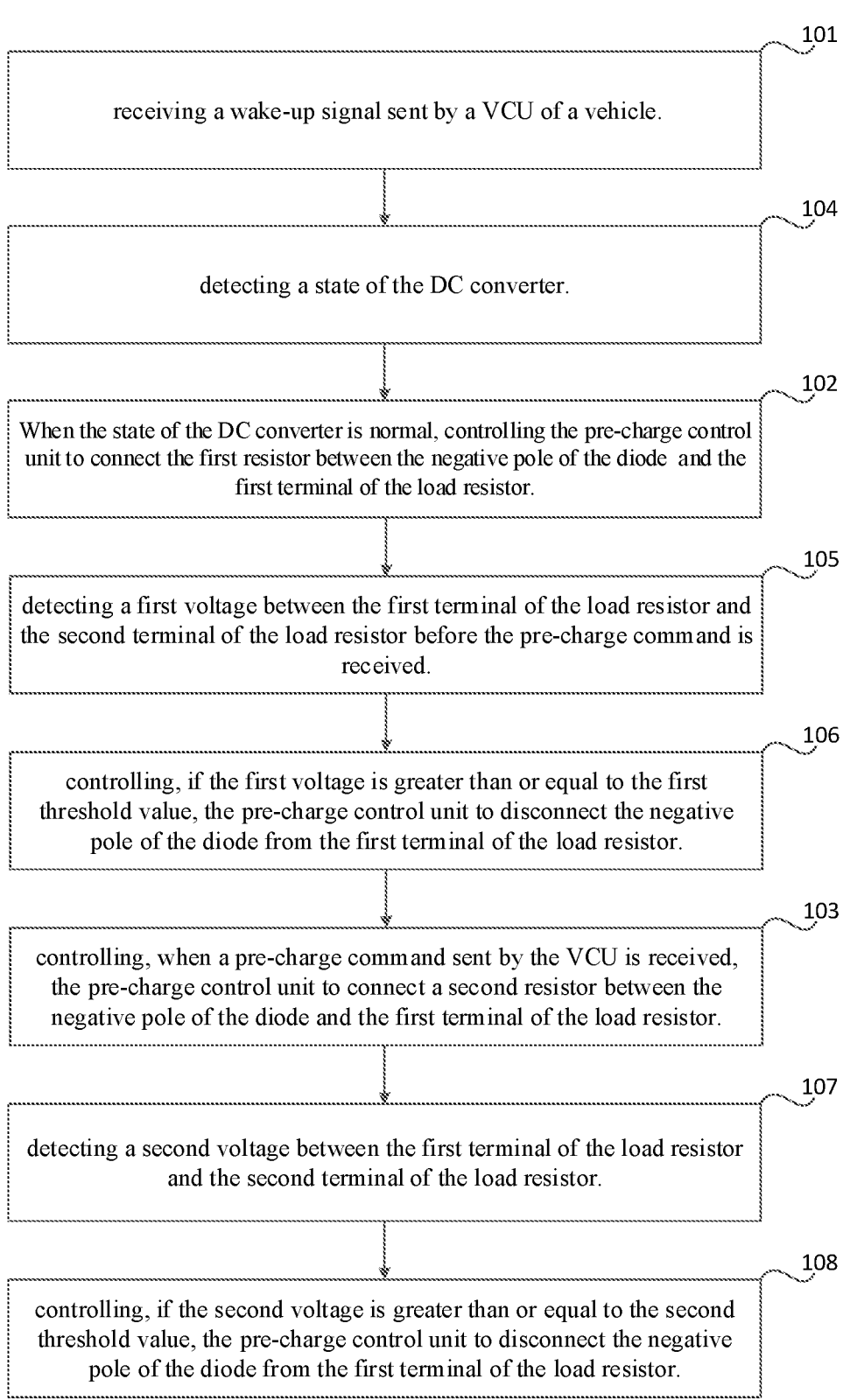

101 receiving a wake-up signal sent by a VCU of a vehicle.

104 detecting a state of the DC converter.

102

When the state of the DC converter is normal, controlling the pre-charge control unit to connect the first resistor between the negative pole of the diode and the first terminal of the load resistor.

105 detecting a first voltage between the first terminal of the load resistor and the second terminal of the load resistor before the pre-charge command is received.

106 controlling, if the first voltage is greater than or equal to the first threshold value, the pre-charge control unit to disconnect the negative pole of the diode from the first terminal of the load resistor.

103 controlling, when a pre-charge command sent by the VCU is received, the pre-charge control unit to connect a second resistor between the negative pole of the diode and the first terminal of the load resistor.

107 detecting a second voltage between the first terminal of the load resistor and the second terminal of the load resistor.

108 controlling, if the second voltage is greater than or equal to the second threshold value, the pre-charge control unit to disconnect the negative pole of the diode from the first terminal of the load resistor.

FIG. 7

DIRECT CURRENT CONVERTER, CONTROLLING METHOD, AND VEHICLE

CROSS-REFERENCE TO RELATED APPLICATIONS

This application claims priority to PCT/CN2021/121650, having a filing date of Sep. 29, 2021, which is based on Chinese Patent Application No. 202011080080.8, having a filing date of Oct. 10, 2020, the entire contents both of which are hereby incorporated by reference.

FIELD OF TECHNOLOGY

The following relates to the field of vehicle controlling, and more particularly to a direct current converter, a controlling method, and a vehicle.

BACKGROUND

With the rapid development of society, the number of vehicles is increasing. However, vehicles using traditional energy will pollute the environment due to the exhaust gas generated by burning petroleum fuel. At the same time, the problem of non-renewable traditional energy is becoming more and more serious. Therefore, it has become an inevitable trend to vigorously develop new energy, and electric vehicles using environment-friendly new energy have become a major trend in the development of automotive technology. Compared with traditional vehicles, electric vehicles increase the process of power on and power off. During the power on process of electric vehicle, the direct current (DC) converter is required to invert the low-voltage power supply to the high-voltage power supply through the reverse pre-charging function, so as to complete the pre-charging of the DC circuit, so as to avoid damage to the components on the DC circuit after the high-voltage power supply is connected. Generally, after the pre-charge command sent by Vehicle Control Unit (VCU) is received, the DC converter starts to pre-charge the DC circuit with a constant current. The control of the DC converter is not flexible enough, which affects the pre-charge efficiency of the DC converter.

SUMMARY

An aspect relates to a DC converter to solve the technical problem that the control of the DC converter is not flexible enough in the conventional art.

A second aspect of the present disclosure is to provide a method for controlling the DC converter.

A third aspect of the present disclosure is to provide a vehicle.

In order to achieve above, a first aspect of the present disclosure provides a DC converter, which includes: a first inductor, a switching unit, a diode, a first capacitor, a load resistor, a pre-charge control unit and a controller;

a first terminal of the first inductor is connected with a positive electrode of the diode, and a second terminal of the first inductor is connected with a positive electrode of a low-voltage power supply; a first terminal of the switching unit is connected with a negative electrode of the low-voltage power supply, and a second terminal of the switching unit is connected with the first terminal of the first inductor; a negative electrode of the diode is connected with a first terminal of the pre-charge control unit, and a second terminal of the pre-charge control unit is connected with the first terminal of the switching unit; and the first capacitor is connected in parallel with the load resistor;

a first terminal of the load resistor is connected with a positive electrode of a high-voltage power supply through a main relay, and a second terminal of the load resistor is connected with a negative electrode of the high-voltage power supply; and a control terminal of the switching unit is connected with an output terminal of the controller;

the controller is configured for controlling the switching unit to be turned on or turned off; and the controller is configured to control a resistor connected between the negative electrode of the diode and the first terminal of the load resistor in the pre-charge control unit when the switching unit is turned off, such that the direct current converter is pre-charged by the low-voltage power supply.

According to an embodiment of the present disclosure, the pre-charge control unit includes:

a first pre-charge branch including a first resistor and a first switch; and a second pre-charge branch including a second resistor and a second switch, and the first resistor being greater than the second resistor;

a first terminal of the first resistor is acted as the first terminal of the pre-charge control unit, and a second terminal of the first resistor is connected with a first terminal of the first switch; a second terminal of the first switch is acted as the second terminal of the pre-charge control unit, a first terminal of the second resistor is connected with the first terminal of the first resistor, and a second terminal of the second resistor is connected with a first terminal of the second switch, a second terminal of the second switch is connected with the second terminal of the first switch, a control terminal of the first switch is connected with the output terminal of the controller and acted as a first control terminal of the pre-charge control unit, and a control terminal of the second switch is connected with the output terminal of the controller and acted as a second control terminal of the pre-charge control unit;

the controller is configured to control the first switch to be turned on and the second switch to be turned off when the switching unit is turned off and a pre-charge command is not received; and the controller is further configured to control the first switch to be turned off and the second switch to be turned on when the switching unit is turned off and the pre-charge command is received.

According to an embodiment of the present disclosure, the controller is further configured to control the pre-charge control unit to disconnect the negative electrode of the diode from the first terminal of the load resistor when the pre-charge command is not received and a voltage between the first terminal of the load resistor and the second terminal of the load resistor is greater than or equal to a first threshold value.

According to an embodiment of the present disclosure, the controller is further configured to control the pre-charge control unit to disconnect the negative electrode of the diode from the first terminal of the load resistor when the pre-charge command is received and a voltage between the first terminal of the load resistor and the second terminal of the load resistor is greater than or equal to a second threshold value.

The embodiment of the first aspect of the present disclosure provides the DC converter, which is pre-charged by the low-voltage power supply by controlling the resistor between the negative electrode of the diode and the first terminal of the load resistor in the pre-charge control unit. The present disclosure can flexibly control the current pre-charging the DC converter by controlling the resistor connected between the diode and the load resistor, thereby improving the pre-charge efficiency of the DC converter.

In order to achieve above object, a second aspect of the present disclosure provides a method for controlling a DC converter. The method is applied to the direct current converter of any one of the first aspect. The DC converter includes: a first inductor, a switching unit, a diode, a first capacitor, a load resistor, a pre-charge control unit and a controller; and the method includes:

receiving a wake-up signal sent by a vehicle control unit of a vehicle;

controlling the pre-charge control unit to connect a first resistor between a negative electrode of the diode and a first terminal of the load resistor, such that the low-voltage power supply pre-charges the direct current converter according to a first current; and controlling, when a pre-charge command sent by the vehicle control unit is received, the pre-charge control unit to connect a second resistor between the negative electrode of the diode and the first terminal of the load resistor, such that the low-voltage power supply pre-charges the direct current converter according to a second current, and the first resistor being greater than the second resistor.

According to an embodiment of the present disclosure, before the step of controlling the pre-charge control unit to connect a first resistor between a negative electrode of the diode and a first terminal of the load resistor, the method further includes:

detecting a state of the direct current converter; and the step of controlling the pre-charge control unit to connect a first resistor between a negative electrode of the diode and a first terminal of the load resistor includes:

controlling, when the state of the direct current converter is normal, the pre-charge control unit to connect the first resistor between the negative electrode of the diode and the first terminal of the load resistor.

According to an embodiment of the present disclosure, the method further includes:

detecting the first voltage between the first terminal of the load resistor and the second terminal of the load resistor before the pre-charge command is received; and controlling the pre-charge control unit to disconnect the negative electrode of the diode from the first terminal of the load resistor if the first voltage is greater than or equal to the first threshold value.

According to an embodiment of the present disclosure, after controlling the pre-charge control unit to connect a second resistor between the negative electrode of the diode and the first terminal of the load resistor, the method further includes:

detecting a second voltage between the first terminal of the load resistor and the second terminal of the load resistor; and controlling the pre-charge control unit to disconnect the negative electrode of the diode from the first terminal of the load resistor if the second voltage is greater than or equal to the second threshold value.

The embodiment of the second aspect of the present disclosure provides the method for controlling the DC converter, which is pre-charged by the low-voltage power supply by controlling the resistor between the negative electrode of the diode and the first terminal of the load resistor in the pre-charge control unit. The present disclosure can flexibly control the current pre-charging the DC converter by controlling the resistor connected between the diode and the load resistor, thereby improving the pre-charge efficiency of the DC converter.

In order to achieve above object, a third aspect of the present disclosure provides a vehicle, which includes: a low-voltage power supply, a high-voltage power supply and a direct current converter according to any one of the first aspect.

Additional aspects and advantages of the present disclosure will be given in part in the following description, and some will become apparent from the following description, or learned from the practice of the present disclosure.

BRIEF DESCRIPTION

Some of the embodiments will be described in detail, with references to the following Figures, wherein like designations denote like members, wherein:

FIG. 3 is a schematic diagram of the pre-charge time shown according to the embodiment shown in FIG. 2;

FIG. 4 is a flowchart of a method for controlling a DC converter shown according to an exemplary embodiment;

FIG. 5 is a flowchart of another method for controlling a DC converter shown according to an exemplary embodiment;

FIG. 6 is a flowchart of another method for controlling a DC converter shown according to an exemplary embodiment;

FIG. 7 is a flowchart of another method for controlling a DC converter shown according to an exemplary embodiment;

Figure 9:
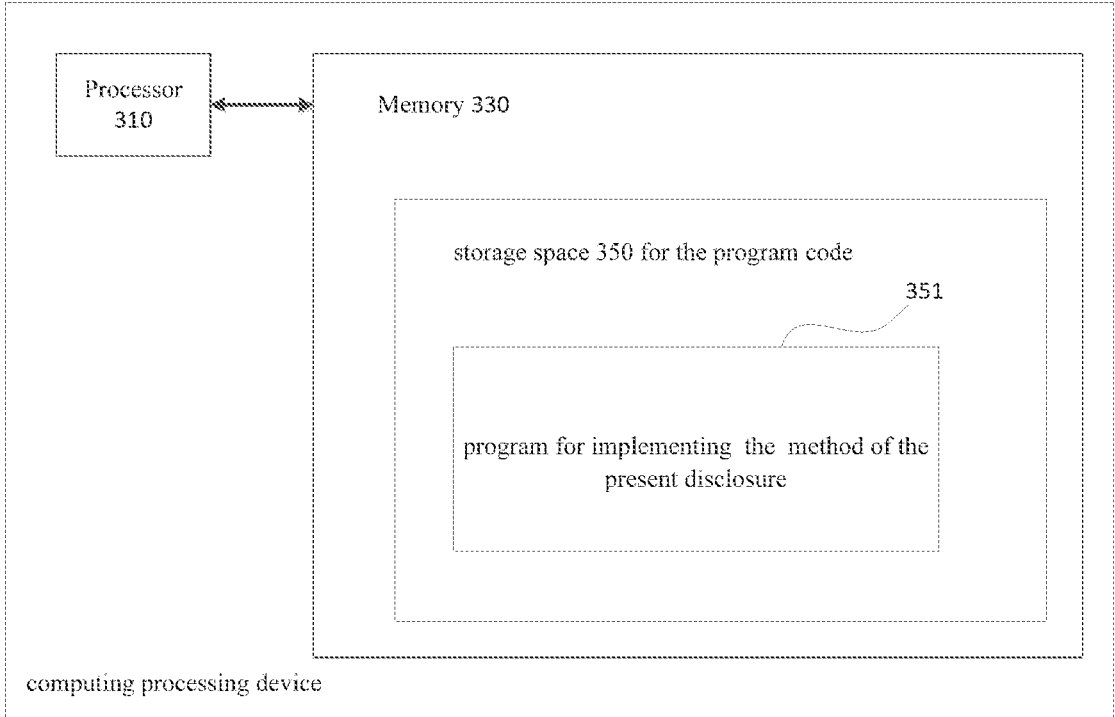
Figure 10:
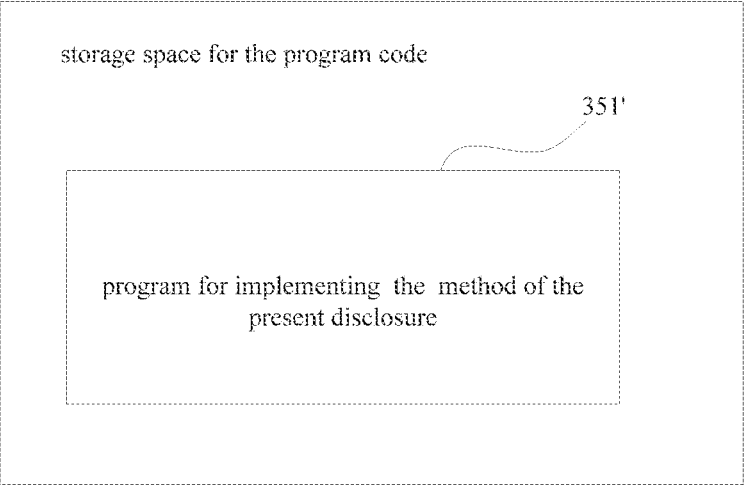

FIG. 9 provides a structure diagram of a computing processing device according to an embodiment of the present disclosure; and FIG. 10 provides a schematic diagram of a storage unit for portable or fixed implementation of program code according to embodiments of the method.

DETAILED DESCRIPTION

A DC converter, a controlling method, a vehicle, a device, a program, and a medium of the embodiment of the present disclosure are described below with reference to the accompanying drawings.

Before describing the DC converter, the controlling method, the vehicle, the device, the program and the medium provided by the present disclosure, first introduce the application scenario involved in each embodiment of the present disclosure. The application scenario can be a DC converter set on the vehicle, that is, a Direct Current to Direct Current (DC/DC) converter. In addition, the vehicle can also be equipped with a low-voltage power supply and a high-voltage power supply. The vehicle can be any micro hybrid vehicle equipped with 48V power battery as the energy source.

Figures 1, 2:
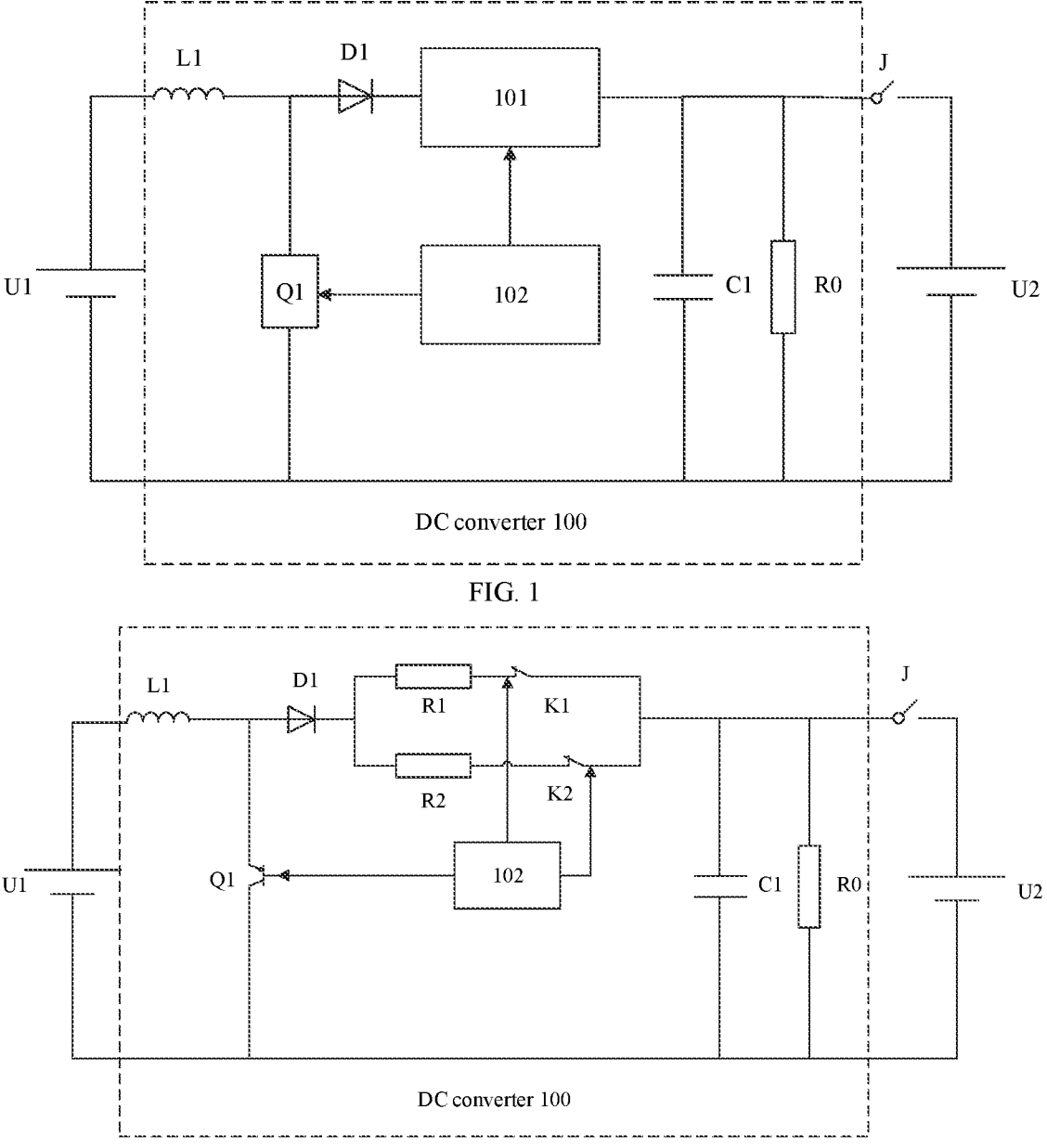
FIG. 1 is a schematic diagram of a DC converter shown according to an exemplary embodiment.
FIG. 2 is a circuit diagram of a pre-charge control unit shown according to the embodiment shown in FIG. 1.

FIG. 1 is a schematic diagram of a DC converter shown according to an exemplary embodiment. As shown in FIG. 1, the DC converter 100 includes: a first inductor L1, a switching unit Q1, a diode D1, a first capacitor C1, a load resistor R0, a pre-charge control unit 101, and a controller 102.

The first terminal of the first inductor L1 is connected with the positive electrode of the diode D1, the second terminal of the first inductor L1 is connected with the positive electrode of the low-voltage power supply U1, the first terminal of the switching unit Q1 is connected with the negative electrode of the low-voltage power supply U1, the second terminal of the switching unit Q1 is connected with the first terminal of the first inductor L1, the negative electrode of the diode D1 is connected with the first terminal of the pre-charge control unit 101, and the second terminal of the pre-charge control unit 101 is connected with the first terminal of the load resistor R0, the second terminal of the load resistor R0 is connected with the first terminal of the switching unit Q1, and the first capacitor C1 is connected in parallel with the load resistor R0.

The first terminal of the load resistor R0 is connected with the positive electrode of the high-voltage power supply U2 through the main relay J, the second terminal of the load resistor R0 is connected with the negative electrode of the high-voltage power supply U2, the control terminal of the switching unit Q1 is connected with the output terminal of the controller 102, and the control terminal of the pre-charge control unit 101 is connected with the output terminal of the controller 102.

The controller 102 is configured to control the switching unit Q1 to be turned on or turned off.

The controller 102 is configured to control the resistor connected between the negative electrode of the diode D1 and the first terminal of the load resistor R0 in the pre-charge control unit 101 when the switching unit Q1 is disconnected, so that the low-voltage power supply U1 pre-charges the DC converter 100.

For example, when the driver turns the ignition switch of the vehicle and switches the power mode to KL15 ON, that is, controls the vehicle startup. At this time, the Key Body Control Module (KBCM) of the vehicle sends a wake-up signal, the DC converter 100 can initialize first after the wake-up signal is received, for example, the initialization can be the initialization of various components (such as resistors, capacitors, etc.) inside the DC converter 100. Since the initialization time of DC converter 100 is shorter than that of other components in the vehicle (such as battery management system, motor controller, relay, etc.), the DC converter 100 can control the switching unit Q1 to be turned off through the controller 102 after initialization. At this time, the circuit formed by the low-voltage power supply U1 and the first inductor L1 is conductive, and low-voltage power supply U1 supplies power to the first inductor L1, so that the first inductor L1 stores energy. After the first inductor L1 reaches the stable state, the controller 102 can further control the switching unit Q1 to be turned off, and the controller 102 can control the resistor connected between the negative electrode of the diode D1 and the first terminal of the load resistor R0 in the pre-charge control unit 101, so that the low-voltage power supply U1 and the first inductor L1 pre-charge the DC converter 100. In which, the switching unit Q1 can be a switching tube, such as a triode, a Comprehensive Metal Oxide Semiconductor (CMOS), a Positive channel Metal Oxide Semiconductor (PMOS), a Negative channel Metal Oxide Semiconductor (NMOS), etc.

In the embodiment, the pre-charge control unit 101 can have multiple pre-charge branches, each pre-charge branch includes a resistor and a switch, and the resistance values of the resistors included in each pre-charge branch are different. In this way, the controller 102 can turn off the switches on different pre-charge branches according to different situations, so that the resistors on the pre-charge branches are connected between the negative electrode of the diode D1 and the first terminal of the load resistor R0, so as to control the current of low-voltage power supply U1 to pre-charge the DC converter 100.

In one implementation method, before the pre-charge command sent by the VCU is received, a resistor with larger resistance value is connected between the negative electrode of the diode D1 and the first terminal of the load resistor R0, so that the low-voltage power supply U1 can pre-charge the DC converter 100 according to a smaller current. Then, after the pre-charge command sent by VCU is received, a resistor with smaller resistance value is connected between the negative electrode of the diode D1 and the first terminal of the load resistor R0, so that the low-voltage power supply U1 pre-charges the DC converter 100 according to a larger current.

In another implementation method, the resistor connected between the negative electrode of the diode D1 and the first terminal of the load resistor R0 can also be controlled according to the voltage at both ends of the first capacitor C1. Taking the power on process of Belt driven Starter Generator (BSG) system of 48V as an example, the high-voltage power supply is 48V battery, and the low-voltage power supply is 12V battery. After the DC converter 100 receives the wake-up signal, the controller 102 first controls the switching unit Q1 to be turned off. At this time, the circuit formed by the low-voltage power supply U1 and the first inductor L1 is conductive, and the low-voltage power supply U1 supplies power to the first inductor L1, so that the first inductor L1 stores energy. After the first inductor L1 reaches the stable state, the controller 102 controls the switching unit Q1 to be turned off, then the resistor of a first resistance value (such as 10Ω) can be controlled to connect between the negative electrode of the diode D1 and the first terminal of the load resistor R0, so that the low-voltage power supply U1 pre-charges the DC converter 100 according to the current of 100 mA. Furthermore, when the voltage at both ends of the first capacitor C1 reaches 12V, the controller 102 can control the resistor of a second resistance (the second resistance is less than the first resistance) to be connected between the negative electrode of the diode D1 and the first terminal of the load resistor R0, so that the low-voltage power supply U1 can pre-charge the DC converter 100 according to the current of 2 A until the voltage at both ends of the first capacitor C1 reaches 48V.

In summary, the DC converter in the present disclosure pre-charges the DC converter through the low-voltage power supply by controlling the resistor connected between the negative electrode of the diode and the first terminal of the load resistor in the pre-charge control unit. The present disclosure can flexibly control the current to pre-charge the DC converter by controlling the resistor connected between the diode and the load resistor, thereby improving the pre-charge efficiency of the DC converter.

FIG. 2 is a circuit diagram of the pre-charge control unit shown according to the embodiment shown in FIG. 1. As shown in FIG. 2, the pre-charge control unit 101 includes a first pre-charge branch and a second pre-charge branch, the first pre-charge branch includes a first resistor R1 and a first switch K1, the second pre-charge branch includes a second resistor R2 and a second switch K2, and the first resistor R1 is greater than the second resistor R2.

The first terminal of the first resistor R1 is acted as the first terminal of the pre-charge control unit 101, the second terminal of the first resistor R1 is connected with the first terminal of the first switch K1, the second terminal of the first switch K1 is acted as the second terminal of the pre-charge control unit 101, the first terminal of the second resistor R2 is connected with the first terminal of the first resistor R1, the second terminal of the second resistor R2 is connected with the first terminal of the second switch K2, and the second terminal of the second switch K2 is connected with the second terminal of the first switch K1, the control terminal of the first switch K1 is connected with the output terminal of the controller 102 as the first control terminal of the pre-charge control unit 101, and the control terminal of the second switch K2 is connected with the output terminal of the controller 102 as the second control terminal of the pre-charge control unit 101.

The controller 102 is configured to control the first switch K1 to be turned on and the second switch K2 to be turned off when the switching unit Q1 is turned off and the pre-charge command is not received.

The controller 102 is further configured to control the first switch K1 to be turned off and the second switch K2 to be turned on when the switching unit Q1 is turned off and the pre-charge command is received.

For example, the pre-charge control unit 101 is composed of a first pre-charge branch and a second pre-charge branch, in which the first pre-charge branch includes a first resistor R1 and a first switch K1, the second pre-charge branch includes a second resistor R2 and a second switch K2, and the first resistor R1 is greater than the second resistor R2. That is, when the first switch K1 is turned on, the first resistor R1 is connected between the negative electrode of the diode D1 and the first terminal of the load resistor R0. When the second switch K2 is turned on, the second resistor R2 is connected between the negative electrode of the diode D1 and the first terminal of the load resistor R0.

Specifically, after the first inductor L1 reaches the stable state, the controller 102 controls the switching unit Q1 to be turned off, and controls the first switch K1 of the first pre charging branch to be turned on, and controls the second switch K2 of the second pre charging branch to be turned off. The first resistor R1 is connected to the circuit, and the low-voltage power supply U1 pre-charges the DC converter 100 according to the first current. Since the resistance value of the first resistor is greater than that of the second resistor R2, it can be understood as the small current pre-charging stage of the DC converter 100. When other components in the vehicle except DC converter 100 are initialized, the VCU will send a pre-charge command to DC converter 100. After the DC converter 100 receives the pre-charge command, the controller 102 controls the first switch K1 to be turned off and the second switch K2 to be turned on. When the second resistor R2 is connected to the circuit, the low-voltage power supply U1 pre-charges the DC converter 100 according to the second current. The second current is greater than the first current, which can be understood as the normal pre-charging stage of the DC converter 100. The first current can be 100 mA, and the second current can be 2 A.

FIG. 3 is a schematic diagram of the pre-charge time shown according to the embodiment shown in FIG. 2. As shown in FIG. 3, t1 presents the time when the DC converter 100 completes initialization and starts to pre-charge according to the smaller current, t2 presents the time when the DC converter 100 receives the pre-charge command and starts to pre-charge according to a normal current, and t3 presents the time when the DC converter 100 completes pre-charge according to the embodiment shown in FIG. 2, t4 presents the completion time when the DC converter 100 does not pre-charge before receiving the pre-charge command and starts to pre-charge according to the normal current after receiving the pre-charge command. The t1-t2 presents the smaller current pre-charge stage of the DC converter 100 in the embodiment shown in FIG. 2, t2-t3 is the normal pre-charge stage of the DC converter 100 in the embodiment shown in FIG. 2, and t2-t4 is the normal pre-charge period of the DC converter 100.

In which, t1-t2 can be 300 milliseconds, t2-t3 can be 100 milliseconds, and t2-t4 can be 140 milliseconds. It can be seen from FIG. 3 that according to the embodiment shown in FIG. 2, the DC converter 100 can significantly shorten the pre-charge time by pre-charging according to the smaller current before receiving the pre-charge command.

In one application scenario, the controller 102 is further configured to control the pre-charge control unit 101 to disconnect the negative electrode of the diode D1 from the first terminal of the load resistor R0 when the pre-charge command is not received and the voltage between the first terminal of the load resistor R0 and the second terminal of the load resistor R0 is greater than or equal to the first threshold value.

For example, when the first switch K1 in the first pre-charge branch is turned on and the second switch K2 in the second pre-charge branch is turned off, the DC converter 100 is pre-charged with the first current. During this process, the pre-charge command is not received. If the DC converter 100 detects that the first voltage between the first terminal of the load resistor R0 and the second terminal of the load resistor R0 is greater than or equal to the first threshold value, the controller 102 can control the first switch K1 in the first pre-charge branch to be turned off to disconnect the negative electrode of the diode D1 and the first terminal of the load resistor R0, thus the first current is stopped to pre-charge to wait for the VCU to send the pre-charge command. For example, in an embodiment, the low-voltage power supply is 12V, then the first threshold value is 12V.

In another application scenario, the controller 102 is further configured to control the pre-charge control unit 101 to disconnect the negative electrode of the diode D1 from the first terminal of the load resistor R0 when the pre-charge command is received and the voltage between the first terminal of the load resistor R0 and the second terminal of the load resistor R0 is greater than or equal to the second threshold value.

For example, when the second switch K2 in the second pre-charge branch is turned on and the first switch K1 in the first pre-charge branch is turned off, the DC converter 100 is pre-charged with the second current. During this process, the pre-charge command is received. If the DC converter 100 detects that the second voltage between the first terminal of the load resistor R0 and the second terminal of the load resistor R0 is greater than or equal to the second threshold value, the controller 102 can control the second switch K2 in the second pre-charge branch to be turned off to disconnect the negative electrode of the diode D1 and the first terminal of the load resistor R0, thus the normal current is stopped to pre-charge, and the pre-charging process of the DC converter 100 ends. For example, in an embodiment, the low-voltage power supply is 48V, then the second threshold value is 43.5V.

In summary, the DC converter in the present disclosure pre-charges the DC converter through the low-voltage power supply by controlling the resistor connected between the negative electrode of the diode and the first terminal of the load resistor in the pre-charge control unit. The present disclosure can flexibly control the current to pre-charge the DC converter by controlling the resistor connected between the diode and the load resistor, thereby improving the pre-charge efficiency of the DC converter.

FIG. 4 is a flowchart of a method for controlling a DC converter shown according to an exemplary embodiment. The method is applied to the DC converter 100 shown in FIG. 1. The DC converter 100 includes: a first inductor L1, a switching unit Q1, a diode D1, a first capacitor C1, a load resistor R0, a pre-charge control unit 101, and a controller 102, as shown in FIG. 4. The method includes:

Step 101, receiving a wake-up signal sent by a VCU of a vehicle.

Step 102, controlling the pre-charge control unit 101 to connect a first resistor R1 between a negative electrode of the diode D1 and a first terminal of the load resistor R0, such that the low-voltage power supply U1 pre-charges the DC converter 100 according to a first current.

Step 103, controlling, when a pre-charge command sent by the VCU is received, the pre-charge control unit 101 to connect a second resistor R2 between the negative electrode of the diode D1 and the first terminal of the load resistor R0, such that the low-voltage power supply U1 pre-charges the DC converter 100 according to a second current, and the first resistor R1 being greater than the second resistor R2.

For example, when the driver turns the ignition switch of the vehicle and switches the power mode to KL15 ON, that is, controls the vehicle startup. At this time, the KBCM of the vehicle sends a wake-up signal, the controller 102 in the DC converter 100 can first control the switching unit Q1 to be turned on. At this time, the circuit formed by the low-voltage power supply U1 and the first inductor L1 is conductive, and the low-voltage power supply U1 supplies power to the first inductor L1, so that the first inductor L1 stores energy. After the first inductor L1 reaches the stable state, the controller 102 can further control the switching unit Q1 to be turned off, and control the pre-charge control unit 101 to connect the first resistor between the negative electrode of the diode D1 and the first terminal of the load resistor R0, so that the low-voltage power supply U1 can pre-charge the DC converter 100 according to the first current. Since the resistance value of the first resistor R1 is greater than that of the second resistor R2, it can be understood as the smaller current pre-charging stage of the DC converter 100. When other components in the vehicle except the DC converter 100 complete the initialization, the VCU will send a pre-charge command to the DC converter 100. After the DC converter 100 receives the pre-charge command sent by the VCU, the controller 102 controls the pre-charge control unit 101 to connect a second resistor between the negative electrode of the diode D1 and the first terminal of the load resistor R0. The low-voltage power supply U1 pre-charges the DC converter 100 according to the second current. The second current is greater than the first current, which can be understood as the normal pre-charge stage of the DC converter 100. The first current can be 100 mA, and the second current can be 2 A.

FIG. 5 is a flowchart of another method for controlling the DC converter shown according to an exemplary embodiment. As shown in FIG. 5, before step 102, the method can further include:

Step 104, detecting a state of the DC converter 100.

Correspondingly, the implementation of step 102 can be as follows:

When the state of the DC converter 100 is normal, the control pre-charge control unit 101 connects the first resistor R1 between the negative electrode of the diode D1 and the first terminal of the load resistor R0.

For example, the DC converter 100 receives the wake-up signal sent by the VCU, and then initializes (that is, the status of the DC converter 100 is detected). Since the initialization time of the DC converter 100 is shorter than that of other components in the vehicle (such as battery management system, motor controller, relay, etc.), the controller 102 in the DC converter 100 can first control the switching unit Q1 to be turned on after the initialization of the DC converter 100, that is, when the status of the DC converter 100 is normal, at this time, the circuit formed by the low-voltage power supply U1 and the first inductor L1 is conductive, and the low-voltage power supply U1 supplies power to the first inductor L1 so that the first inductor L1 stores energy. After the first inductor L1 reaches the stable state, the controller 102 can further control the switching unit Q1 to be turned off, and control the pre-charge control unit 101 to connect the first resistor between the negative electrode of the diode D1 and the first terminal of the load resistor R0, so that the low-voltage power supply U1 can pre-charge the DC converter 100 according to the first current. Since the resistance value of the first resistor R1 is greater than that of the second resistor R2, it can be understood as the smaller current pre-charging stage of the DC converter 100, and the first current can be 100 mA.

FIG. 6 is a flowchart of another method for controlling the DC converter shown according to an exemplary embodiment, as shown in FIG. 6 6. The method further includes:

Step 105, detecting a first voltage between the first terminal of the load resistor R0 and the second terminal of the load resistor R0 before the pre-charge command is received.

Step 106, controlling, if the first voltage is greater than or equal to the first threshold value, the pre-charge control unit 101 to disconnect the negative electrode of the diode D1 from the first terminal of the load resistor R0.

For example, when the DC converter 100 completes the initialization but the pre-charge command is not received, the DC converter 100 is pre-charged using the first current to pre-charge. During this process, the DC converter 100 detects the first voltage between the first terminal of the load resistor R0 and the second terminal of the load resistor R0. If the first voltage between the first terminal of the load resistor R0 and the second terminal of the load resistor R0 is greater than or equal to the first threshold value, the controller 102 can control the first switch K1 in the first pre-charge branch to be turned off to disconnect the negative electrode of the diode D1 from the first terminal of the load resistor R0, so as to stop pre-charging with the first current, and to wait for the VCU to send the pre-charge command. In an embodiment, the low-voltage power supply is 12V, the first threshold can be 12V.

FIG. 7 is a flowchart of another method for controlling the DC converter shown according to an exemplary embodiment. As shown in FIG. 7, after the controlling pre-charge control unit 101 to connect the second resistor R2 between the negative electrode of the diode D1 and the first terminal of the load resistor R0, the method further includes:

Step 107, detecting a second voltage between the first terminal of the load resistor R0 and the second terminal of the load resistor R0.

Step 108, controlling, if the second voltage is greater than or equal to the second threshold value, the pre-charge control unit 101 to disconnect the negative electrode of the diode D1 from the first terminal of the load resistor R0.

For example, when the DC converter 100 has received the pre-charge command, the DC converter 100 uses the second current to pre-charge. During this process, the DC converter 100 detects the second voltage between the first terminal of the load resistor R0 and the second terminal of the load resistor R0. If the second voltage between the first terminal of the load resistor R0 and the second terminal of the load resistor R0 is greater than or equal to the second threshold value, the controller 102 controls the second switch K2 in the second pre-charge circuit to be turned off to disconnect the negative electrode of the diode D1 from the first terminal of the load resistor R0, thus, the pre-charging with normal current is stopped, and the pre-charging process of the DC converter 100 is ended. In an embodiment, the low-voltage power supply is 48V, then the second threshold value is 43.5V.

In summary, the DC converter in the present disclosure pre-charges the DC converter through the low-voltage power supply by controlling the resistor connected between the negative electrode of the diode and the first terminal of the load resistor in the pre-charge control unit. The present disclosure can flexibly control the current to pre-charge the DC converter by controlling the resistor connected between the diode and the load resistor, thereby improving the pre-charge efficiency of the DC converter.

Figure 8:
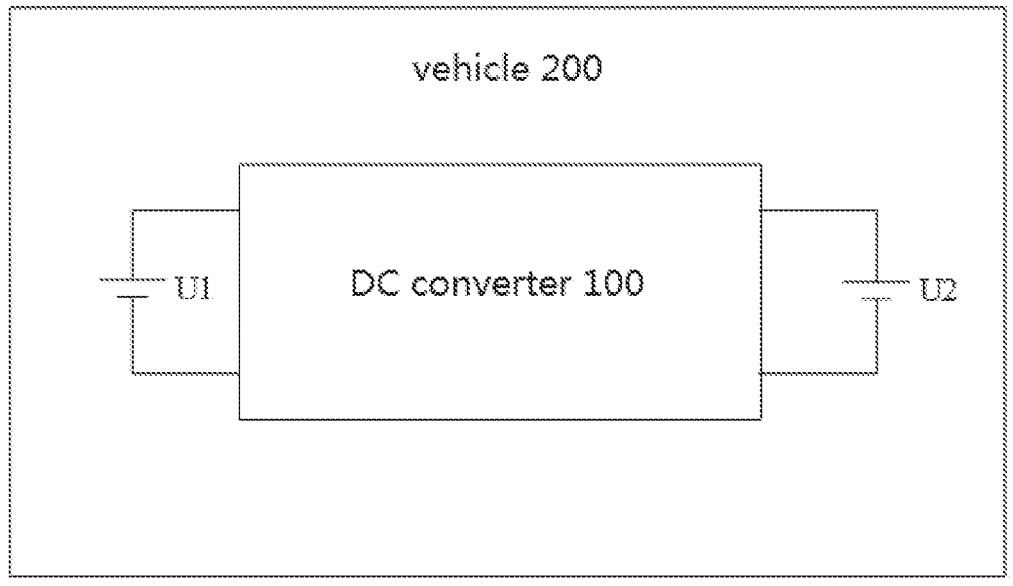
FIG. 8 is a block diagram of a vehicle shown according to an exemplary embodiment.

The present disclosure further relates to a vehicle. As shown in FIG. 8, the vehicle 200 is provided with a low-voltage power supply U1, a high-voltage power supply U2 and any one of DC converters 100 shown in the above embodiments.

With respect to the vehicle 200 in the above embodiment, the specific operation method of the DC converter 100 has been described in detail in the embodiment of the DC converter 100, and will not be described in detail here.

In summary, the DC converter in the present disclosure pre-charges the DC converter through the low-voltage power supply by controlling the resistor connected between the negative electrode of the diode and the first terminal of the load resistor in the pre-charge control unit. The present disclosure can flexibly control the current to pre-charge the DC converter by controlling the resistor connected between the diode and the load resistor, thereby improving the pre-charge efficiency of the DC converter.

In order to implement the above embodiments, the present disclosure further provides a computing processing device, which includes:

a memory, computer readable codes are stored therein; and at least one processor;

when the computer-readable codes are executed by the at least one processor, the computing processing device executes the method for controlling a direct current converter mentioned above.

In order to implement the above embodiments, the present disclosure further provides a computer program, which includes: computer-readable codes, when the computer-readable codes are running on a computing processing device, the computing processing device executes the method for controlling a direct current converter mentioned above.

In order to implement the above embodiments, the present disclosure further provides a computer-readable storage medium, wherein the computer program mentioned above is stored therein.

FIG. 9 provides a structural schematic diagram of a computing processing device for the embodiment of the present disclosure. The computing processing apparatus typically includes a processor 310 and a computer program product (non-transitory computer readable storage medium having instructions, which when executed by a processor, perform actions) or computer-readable medium in the form of a memory 330. The memory 330 may be an electronic memory such as flash memory, electrically erasable programmable read only memory (EEPROM), EPROM, hard disk, or ROM. The memory 330 has a storage space 350 of program code 351 for executing any of the method steps described above. For example, the storage space 350 for program code may include each program code 351 for implementing various steps in the above method. These program codes can be read from or written into one or more computer program products. These computer program products include program code carriers such as hard disk, compact disc (CD), memory card, or floppy disk. Such a computer program product is usually a portable or fixed storage unit as shown in FIG. 6. The storage unit may have storage segments, storage spaces, and the like arranged similarly to the memory 330 in the server of FIG. 5. The program code may be compressed in an appropriate form, for example. Generally, the storage unit includes computer readable code 351', that is, codes that can be read by a processor such as 310, when the codes are run by a server, which causes the server to perform the steps in the method described above.

In the description of the specification, reference to the description of the terms "one embodiment", "some embodiments", "examples", "specific examples", or "some examples" means that specific features, structures, materials, or features described in combination with the embodiment or example are included in at least one embodiment or example of the present disclosure. In this specification, the illustrative expression of the above terms need not refer to the same embodiments or examples. Furthermore, the specific features, structures, materials, or features described may be combined in an appropriate manner in any one or more embodiments or examples. In addition, those skilled in the art can combine and combine different embodiments or examples described in this specification and the characteristics of different embodiments or examples without contradiction.

In addition, the terms "first" and "second" are only used for description purposes and cannot be understood as indicating or implying relative importance or implicitly indicating the number of indicated technical features. Thus, the features defined as "first" and "second" can explicitly or implicitly include at least one such feature. In the description of this disclosure, "multiple" means at least two, such as two, three, etc., unless otherwise specifically defined.

Any process or method description in the flowchart or otherwise described herein can be understood as representing a module, segment or part of code including one or more executable instructions for implementing the steps of a custom logic function or process, and the scope of the preferred embodiments of the present disclosure includes additional implementations, which may not be in the order shown or discussed, It should be understood by those skilled in the art of the embodiments of the present disclosure that functions are performed in a substantially simultaneous manner or in reverse order according to the functions involved.

The logic and/or steps represented in the flowchart or otherwise described herein, for example, can be considered as a sequenced list of executable instructions for implementing logic functions, which can be specifically implemented in any computer-readable medium for the instruction execution system, device or apparatus (such as a computer based system, a system including a processor, or other system that can take instructions from and execute instructions from an instruction execution system, device, or apparatus) is used, or is used in combination with, an instruction execution system, device, or apparatus. For the purposes of the specification, a "computer-readable medium" may be any device that may include, store, communicate, propagate, or transmit programs for use by or in conjunction with instruction execution system, device, or apparatus. More specific examples (non-exhaustive list) of computer-readable media include the following: an electrical connector (electronic device) with one or more wiring, a portable computer disk box (magnetic device), a random-access memory (RAM), a read-only memory (ROM), an erasable and editable read-only memory (EPROM or flash memory), an optical fiber device, and a portable optical disk read-only memory (CDROM). In addition, the computer-readable medium can even be a paper or other suitable medium on which the program can be printed, because the program can be acquired electronically, for example, by optical scanning of the paper or other medium, then editing, interpreting, or processing in other suitable ways when necessary, and then stored in a computer memory.

It should be understood that the various parts of the present disclosure may be implemented in hardware, software, firm ware, or a combination thereof. In the above embodiments, a plurality of steps or methods may be implemented with software or firmware stored in memory and executed by a suitable instruction execution system. For example, if the hardware implementation is the same as that in another embodiment, it can be realized by any one of the following technologies known in the art or their combination: discrete logic circuit with logic gate circuit for realizing logic function on data signal, special integrated circuit with suitable combined logic gate circuit, programmable gate array (PGA), field programmable gate array (FPGA), etc.

Those skilled in the art can understand that all or part of the steps carried by the method of implementing the above embodiments can be completed by instructing relevant hardware through a program. The program can be stored in a computer-readable storage medium. When the program is executed, it includes one or a combination of the steps of the method embodiment.

In addition, each functional unit in each embodiment of the present disclosure can be integrated in a processing module, or each unit can exist physically independently, or two or more units can be integrated in a module. The above integrated modules can be implemented in the form of hardware or software function modules. If the integrated module is realized in the form of a software functional module and sold or used as an independent product, it can also be stored in a computer readable storage medium.

The storage medium mentioned above can be read-only memory, disk or optical disk.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A direct current converter, comprising:
   a first inductor, a switching unit, a diode, a first capacitor, a load resistor, a pre-charge control unit, and a controller;
   wherein a first terminal of the first inductor is connected with a positive electrode of the diode, and a second terminal of the first inductor is connected with a positive electrode of a low-voltage power supply; a first terminal of the switching unit is connected with a negative electrode of the low-voltage power supply, and a second terminal of the switching unit is connected with the first terminal of the first inductor; a negative electrode of the diode is connected with a first terminal of the pre-charge control unit, and a second terminal of the pre-charge control unit is connected with the first terminal of the switching unit; and the first capacitor is connected in parallel with the load resistor;
   wherein a first terminal of the load resistor is connected with a positive electrode of a high-voltage power supply through a main relay, and a second terminal of the load resistor is connected with a negative electrode of the high-voltage power supply; and a control terminal of the switching unit is connected with an output terminal of the controller;
   wherein the controller is configured for controlling the switching unit to be turned on or turned off; and
   wherein the controller is configured to control a resistor connected between the negative electrode of the diode and the first terminal of the load resistor in the pre-charge control unit when the switching unit is turned off, such that the direct current converter is pre-charged by the low-voltage power supply.

2. The direct current converter according to claim 1, wherein the pre-charge control unit comprises:
   a first pre-charge branch, comprising: a first resistor and a first switch; and
   a second pre-charge branch, comprising: a second resistor and a second switch, and the first resistor being greater than the second resistor;
   wherein a first terminal of the first resistor is acted as the first terminal of the pre-charge control unit, and a second terminal of the first resistor is connected with a first terminal of the first switch; a second terminal of the first switch is acted as the second terminal of the pre-charge control unit, a first terminal of the second resistor is connected with the first terminal of the first resistor, and a second terminal of the second resistor is connected with a first terminal of the second switch, a second terminal of the second switch is connected with the second terminal of the first switch, a control terminal of the first switch is connected with the output terminal of the controller and acted as a first control terminal of the pre-charge control unit, and a control terminal of the second switch is connected with the output terminal of the controller and acted as a second control terminal of the pre-charge control unit;

the controller is configured to control the first switch to be turned on and the second switch to be turned off when the switching unit is turned off and a pre-charge command is not received; and the controller is further configured to control the first switch to be turned off and the second switch to be turned on when the switching unit is turned off and the pre-charge command is received.

3. The direct current converter according to claim 2, wherein the controller is further configured to control the pre-charge control unit to disconnect the negative electrode of the diode from the first terminal of the load resistor when the pre-charge command is not received and a voltage between the first terminal of the load resistor and the second terminal of the load resistor is greater than or equal to a first threshold value.

4. The direct current converter according to claim 2, wherein the controller is further configured to control the pre-charge control unit to disconnect the negative electrode of the diode from the first terminal of the load resistor when the pre-charge command is received and a voltage between the first terminal of the load resistor and the second terminal of the load resistor is greater than or equal to a second threshold value.

5. A method for controlling a direct current converter, applied to a direct current converter, the direct current converter comprising: a first inductor, a switching unit, a diode, a first capacitor, a load resistor, a pre-charge control unit and a controller;

wherein a first terminal of the first inductor is connected with a positive electrode of the diode, and a second terminal of the first inductor is connected with a positive electrode of a low-voltage power supply; a first terminal of the switching unit is connected with a negative electrode of the low-voltage power supply, and a second terminal of the switching unit is connected with the first terminal of the first inductor; a negative electrode of the diode is connected with a first terminal of the pre-charge control unit, and a second terminal of the pre-charge control unit is connected with the first terminal of the switching unit; and the first capacitor is connected in parallel with the load resistor;

wherein a first terminal of the load resistor is connected with a positive electrode of a high-voltage power supply through a main relay, and a second terminal of the load resistor is connected with a negative electrode of the high-voltage power supply; and a control terminal of the switching unit is connected with an output terminal of the controller;

wherein the controller is configured for controlling the switching unit to be turned on or turned off; and wherein the controller is configured to control a resistor connected between the negative electrode of the diode and the first terminal of the load resistor in the pre-charge control unit when the switching unit is turned off, such that the direct current converter is pre-charged by the low-voltage power supply; and the method comprising:

receiving a wake-up signal sent by a vehicle control unit of a vehicle;

controlling the pre-charge control unit to connect a first resistor between a negative electrode of the diode and a first terminal of the load resistor, such that the low-voltage power supply pre-charges the direct current converter according to a first current; and controlling, when a pre-charge command sent by the vehicle control unit is received, the pre-charge control unit to connect a second resistor between the negative electrode of the diode and the first terminal of the load resistor, such that the low-voltage power supply pre-charges the direct current converter according to a second current, and the first resistor being greater than the second resistor.

6. The method according to claim 5, wherein before the step of controlling the pre-charge control unit to connect a first resistor between a negative electrode of the diode and a first terminal of the load resistor, further comprising:

detecting a state of the direct current converter; and the step of controlling the pre-charge control unit to connect a first resistor between a negative electrode of the diode and a first terminal of the load resistor comprises:

controlling, when the state of the direct current converter is normal, the pre-charge control unit to connect the first resistor between the negative electrode of the diode and the first terminal of the load resistor.

7. The method according to claim 5, further comprising:

detecting the first voltage between the first terminal of the load resistor and the second terminal of the load resistor before the pre-charge command is received; and controlling the pre-charge control unit to disconnect the negative electrode of the diode from the first terminal of the load resistor if the first voltage is greater than or equal to the first threshold value.

8. The method according to claim 5, wherein after controlling the pre-charge control unit to connect a second resistor between the negative electrode of the diode and the first terminal of the load resistor, further comprising:

detecting a second voltage between the first terminal of the load resistor and the second terminal of the load resistor; and controlling the pre-charge control unit to disconnect the negative electrode of the diode from the first terminal of the load resistor if the second voltage is greater than or equal to the second threshold value.

9. A vehicle, provided with a low-voltage power supply, a high-voltage power supply and a direct current converter, and the direct current converter comprising: a first inductor, a switching unit, a diode, a first capacitor, a load resistor, a pre-charge control unit and a controller;

wherein a first terminal of the first inductor is connected with a positive electrode of the diode, and a second terminal of the first inductor is connected with a positive electrode of a low-voltage power supply; a first terminal of the switching unit is connected with a negative electrode of the low-voltage power supply, and a second terminal of the switching unit is connected with the first terminal of the first inductor; a negative electrode of the diode is connected with a first terminal of the pre-charge control unit, and a second terminal of the pre-charge control unit is connected with the first terminal of the switching unit; and the first capacitor is connected in parallel with the load resistor;

wherein a first terminal of the load resistor is connected with a positive electrode of a high-voltage power supply through a main relay, and a second terminal of the load resistor is connected with a negative electrode of the high-voltage power supply; and a control terminal of the switching unit is connected with an output terminal of the controller;

wherein the controller is configured for controlling the switching unit to be turned on or turned off; and wherein the controller is configured to control a resistor connected between the negative electrode of the diode and the first terminal of the load resistor in the pre-charge control unit when the switching unit is turned off, such that the direct current converter is pre-charged by the low-voltage power supply.

10. The vehicle according to claim 9, wherein the pre-charge control unit comprises:

a first pre-charge branch, comprising: a first resistor and a first switch; and a second pre-charge branch, comprising: a second resistor and a second switch, and the first resistor being greater than the second resistor;

wherein a first terminal of the first resistor is acted as the first terminal of the pre-charge control unit, and a second terminal of the first resistor is connected with a first terminal of the first switch; a second terminal of the first switch is acted as the second terminal of the pre-charge control unit, a first terminal of the second resistor is connected with the first terminal of the first resistor, and a second terminal of the second resistor is connected with a first terminal of the second switch, a second terminal of the second switch is connected with the second terminal of the first switch, a control terminal of the first switch is connected with the output terminal of the controller and acted as a first control terminal of the pre-charge control unit, and a control terminal of the second switch is connected with the output terminal of the controller and acted as a second control terminal of the pre-charge control unit;

the controller is configured to control the first switch to be turned on and the second switch to be turned off when the switching unit is turned off and a pre-charge command is not received; and the controller is further configured to control the first switch to be turned off and the second switch to be turned on when the switching unit is turned off and the pre-charge command is received.

11. The vehicle according to claim 10, wherein the controller is further configured to control the pre-charge control unit to disconnect the negative electrode of the diode from the first terminal of the load resistor when the pre-charge command is not received and a voltage between the first terminal of the load resistor and the second terminal of the load resistor is greater than or equal to a first threshold value.

12. The vehicle according to claim 10, wherein the controller is further configured to control the pre-charge control unit to disconnect the negative electrode of the diode from the first terminal of the load resistor when the pre-charge command is received and a voltage between the first terminal of the load resistor and the second terminal of the load resistor is greater than or equal to a second threshold value.

13. The method according to claim 5, wherein the pre-charge control unit comprises:

a first pre-charge branch, comprising: a first resistor and a first switch; and a second pre-charge branch, comprising: a second resistor and a second switch, and the first resistor being greater than the second resistor;

wherein a first terminal of the first resistor is acted as the first terminal of the pre-charge control unit, and a second terminal of the first resistor is connected with a first terminal of the first switch; a second terminal of the first switch is acted as the second terminal of the pre-charge control unit, a first terminal of the second resistor is connected with the first terminal of the first resistor, and a second terminal of the second resistor is connected with a first terminal of the second switch, a second terminal of the second switch is connected with the second terminal of the first switch, a control terminal of the first switch is connected with the output terminal of the controller and acted as a first control terminal of the pre-charge control unit, and a control terminal of the second switch is connected with the output terminal of the controller and acted as a second control terminal of the pre-charge control unit;

the controller is configured to control the first switch to be turned on and the second switch to be turned off when the switching unit is turned off and a pre-charge command is not received; and the controller is further configured to control the first switch to be turned off and the second switch to be turned on when the switching unit is turned off and the pre-charge command is received.

14. The method according to claim 13, wherein the controller is further configured to control the pre-charge control unit to disconnect the negative electrode of the diode from the first terminal of the load resistor when the pre-charge command is not received and a voltage between the first terminal of the load resistor and the second terminal of the load resistor is greater than or equal to a first threshold value.

15. The method according to claim 13, wherein the controller is further configured to control the pre-charge control unit to disconnect the negative electrode of the diode from the first terminal of the load resistor when the pre-charge command is received and a voltage between the first terminal of the load resistor and the second terminal of the load resistor is greater than or equal to a second threshold value.

\* \* \* \* \*